United States Patent [19]
Hurlbrink, III et al.

[11] 3,814,845
[45] June 4, 1974

[54] OBJECT POSITIONING

[75] Inventors: Robert William Hurlbrink, III, Sinking Spring; Liber Joseph Montone, Reading, both of Pa.

[73] Assignees: Bell Telephone Laboratories, Inc., Murray Hill, N.J.; by said Robert William Hurlbrink, III; Western Electric Company, New York, N.Y.; by said Liber Joseph Montone

[22] Filed: Mar. 1, 1973

[21] Appl. No.: 337,265

[52] U.S. Cl............................ 178/6.8, 178/DIG. 36
[51] Int. Cl. ............................................... H04n 7/18
[58] Field of Search......... 178/6.8, DIG. 1, DIG. 36; 356/165, 167, 170

[56] References Cited
UNITED STATES PATENTS

| | | | |
|---|---|---|---|
| 3,449,511 | 6/1969 | Hecker | 178/6.8 |
| 3,567,853 | 3/1971 | Green | 178/6.8 |
| 3,588,347 | 6/1971 | Montone | 178/6.8 |

*Primary Examiner*—Howard W. Britton
*Attorney, Agent, or Firm*—G. W. Houseweart; A. Stapler

[57] ABSTRACT

An object, such as a beam-leaded semiconductor chip, is accurately positioned, despite irregularities in its edges. A television camera produces video signals representing line-by-line scannings of the object. Video signals representing object edge position markers are also generated. The amount of overlap between the marker signals and the camera signals is measured over a plurality of line scans, and the results of these measurements are averaged. This average is used to control object position.

16 Claims, 6 Drawing Figures

OBJECT POSITIONING

BACKGROUND OF THE INVENTION

1. Field of the Invention

This invention relates to methods and apparatus which make it possible to readily, and preferably automatically, position objects with extreme accuracy.

There are many situations in which extreme accuracy in positioning an object is desired. Some of these arise in the processing of semiconductor chips. Such chips are typically very small, e.g., only a few thousandths of an inch on a side. Yet they must be positioned to an accuracy of a fraction of these dimensions, for such purposes as bonding them to a substrate, mounting them on a storage medium, and so forth.

It is to this type of situation that the present invention particularly relates.

2. Description of the Prior Art

Various techniques have been proposed for accurately positioning objects, some of them applicable specifically to the positioning of semiconductor chips. Ordinary visual positioning techniques are generally inadequate to this task, because they involve erratic operator judgment, or because they are too slow, or because of a combination of these factors.

Closed circuit television has been used in attempts to overcome these limitations.

One system utilizing closed circuit television is disclosed in copending U.S. Patent application, Ser. No. 147,051, filed May 26, 1971, in the names of L. J. Montone and L. J. Pietruszynski and assigned to one of the assignees of the present application.

In this prior art system, a television camera is utilized to produce video signals representing the object to be positioned. Other video signals, representing position markers for the object, are electronically generated. These markers, together with a televised image of the object, are displayed on a television monitor. The markers are adjusted so as to outline the desired location of the object image and the object itself is then moved until its monitor image fits within that outline.

The operation of the prior art system can be visualized by reference to FIGS. 1A and 1B. Each of these shows the outline of a monitor image 10 of an object to be positioned, which is assumed to be a conventional beam-leaded semiconductor chip having the customary rectangular body 11, and beam leads 12 extending from that body on all four sides.

Also shown are four position markers 13 through 16 outlining the left, right, top and bottom edges of the desired position of chip image 10.

FIG. 1A shows a chip image 10 having completely regular edges defined by beam leads 12. The prior art system has no difficulty in centering this chip image 10 between left-right position markers 13, 14 and top-bottom position markers 15, 16.

FIG. 1B, on the other hand, shows a chip image 10 in which one beam lead 12a happens to be substantially shorter than the others, so that the chip has an irregular left-hand edge. Now the prior art system has some difficulty in centering chip image 10. If left-right positioning happens to be performed by reference to this short beam lead 12a, then chip image 10 will assume the position shown in FIG. 1B, which is substantially farther to the left than the position of chip image 10 in FIG. 1A. In fact, the center of chip image 10 of FIG. 1B has shifted its position by the full amount by which beam lead 12a is shorter than the other beam leads 12.

In practice, such a shift can cause an error in chip positioning pronounced enough to render the prior art positioning technique inadequate for positioning chips with variable beam lead length.

SUMMARY OF THE INVENTION

Accordingly, it is an object of the invention to provide object positioning with improved accuracy.

It is another object to provide accurate positioning of objects despite irregularities in their edges.

It is another object to provide accurate positioning of objects subject to edge irregularities, utilizing techniques which do not rely on operator judgment.

It is another object to provide positioning of beam-leaded semiconductor chips with improved accuracy.

It is still another object to provide a new and improved step charge circuit which is useful in the practice of the invention.

These, and still other objects which will appear, are achieved in accordance with the present invention as follows.

A television camera is used, as has been done in the prior art, to produce video signals representing line-by-line scannings of the object to be positioned. Additional video signals, representing position markers for the object, are also generated. These additional signals are such that the markers which they represent span the potential edge irregularities of the object, and also extend over a plurality of the object scanning lines. The markers and an image of the object, are displayed on a television monitor.

The markers are adjusted to overlap the desired positions of the respective edges of the object image. The amount of overlap in each line scan is sensed, and the average of these amounts is utilized to control object position.

Preferably, markers are positioned on all four sides of the object image, and the difference between the average overlap of the markers on opposite sides is sensed. The object is then positioned to minimize this difference, thereby equalizing the average overlaps and, in effect, centering the object image between the markers.

For sensing the overlap with each marker, a step charge circuit is preferably used which is so configured as to respond substantially proportionately to the amount of overlap in successive scanning lines.

BRIEF DESCRIPTION OF THE DRAWINGS

For further details, reference may be had to the description which follows, in the light of the accompanying drawings, wherein.

The same reference numerals designate similar elements in the various figures.

DETAILED DESCRIPTION

Figure 1A:
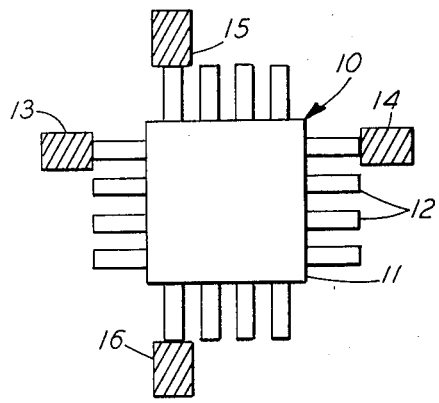
FIGS. 1A and 1B illustrate diagrammatically the behavior of an object positioned in accordance with the prior art.
Figure 1B:
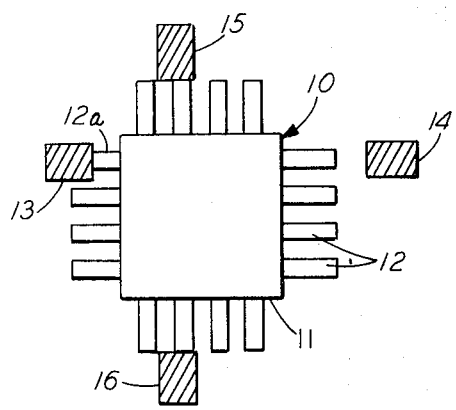

As previously explained, in the section of this specification headed "Description of the Prior Art," FIGS. 1A and 1B show what can happen in prior art object positioning when there are irregularities in the edges of the object to be positioned.

Figure 2A:
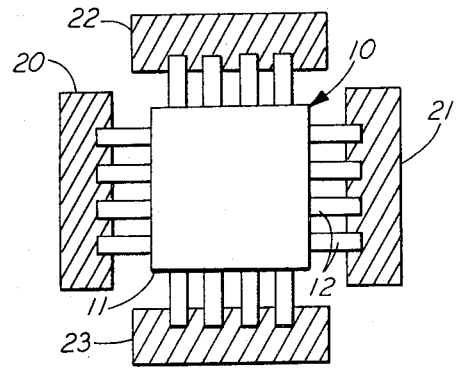
FIGS. 2A and 2B illustrate the corresponding behavior of an object positioned in accordance with the present invention.
Figure 2B:
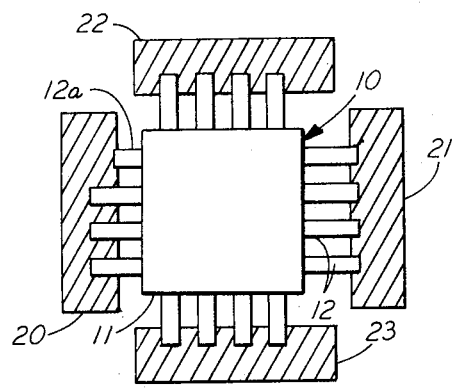

In contrast, FIGS. 2A and 2B, to which reference may now be had, show what happens in positioning the same object in accordance with the present invention.

The object to be positioned is the same semiconductor chip as in the prior art. The monitor image 10, of this chip, with its body 11 and beam leads 12, is shown in FIGS. 2A and 2B.

Four position markers 20 through 23 are electronically generated. These are adjusted to frame the desired monitor position of the chip image 10 at the left, right, top and bottom, respectively. Unlike the prior art, each marker is adjusted to overlap the desired position of the adjacent object image edge (rather than to outline that edge). In addition, each marker is made large enough to be composed of multiple scanned line segments, and also to span the possible irregularities in the adjacent image edge.

For positioning chip image 10, in which edge irregularities typically reflect themselves in irregularities in the tips of beam leads 12, this means that each position marker 20 through 23 should be long enough to span all the beam leads along its adjacent chip edge.

FIG. 2A shows the same chip image 10 as prior art FIG. 1A, namely one with regular edges, defined by uniformly extending beam leads 12. In accordance with the present invention, as described more fully hereinafter, this chip image is centered between left-right markers 20, 21, and top-bottom markers 22, 23.

FIG. 2B, on the other hand, shows the same chip image 10 as prior art FIG. 1B, characterized by having one beam lead 12a shorter than all the others. As shown in FIG. 2B, there will be some displacement of chip image 10 to the left, due to the presence of this short beam lead 12a, but the extent of that displacement will be substantially less than in prior art FIG. 1B. The reasons for this will become apparent from the description of an embodiment of the invention which follows.

Figure 3:
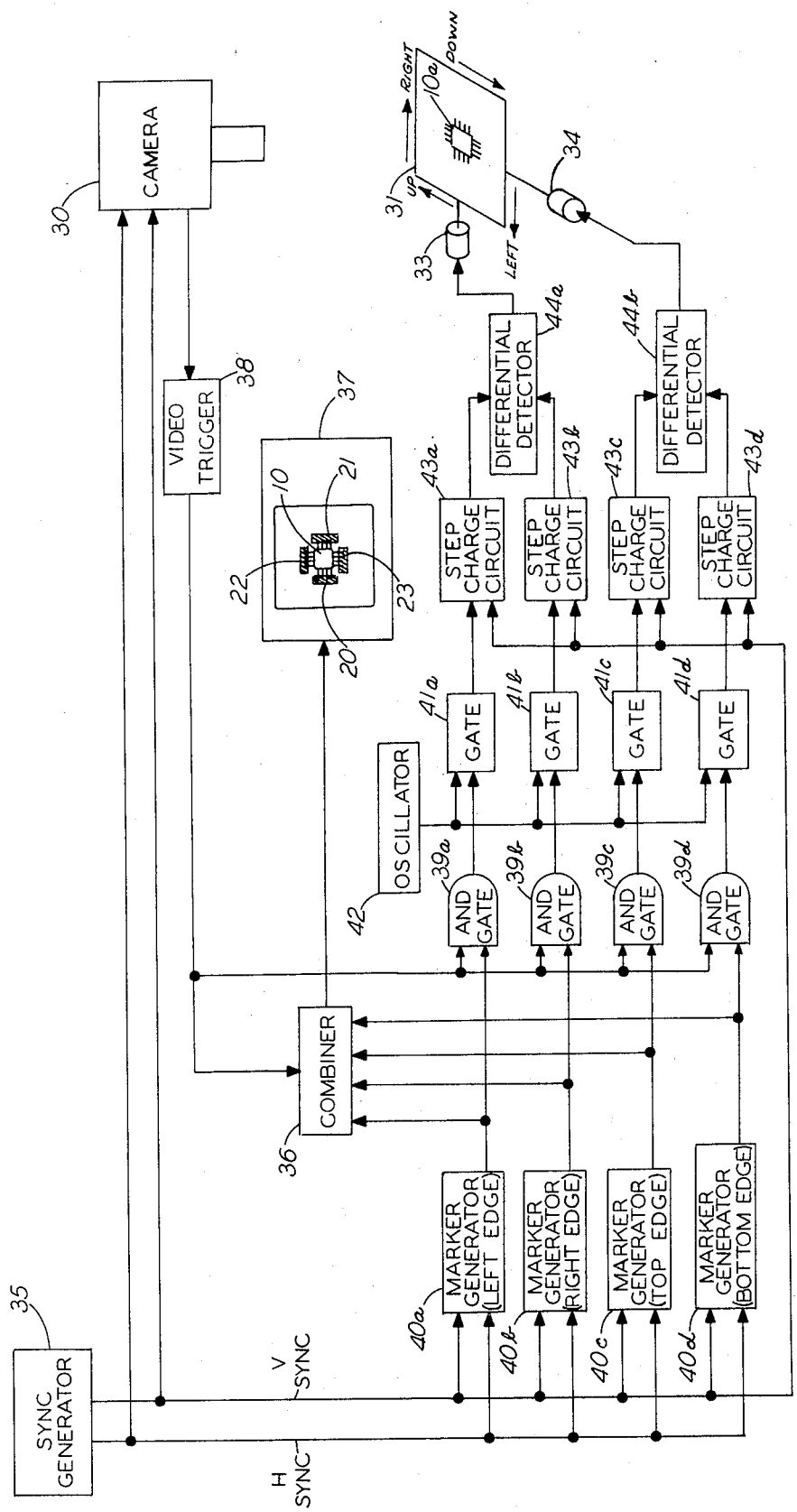
FIG. 3 is an overall illustration, primarily in block diagram form, of a preferred embodiment of the invention.

FIG. 3 of the drawings, to which reference may now be had, shows the general arrangement of such an embodiment.

It includes a television camera 30, which observes a positioning platform 31, on which is placed a chip 10a to be positioned.

Before proceeding, it is desired to explain the relationship between chip 10a shown on platform 31 in FIG. 3, and chip image 10 shown in FIGS. 1A, 1B, 2A and 2B. The former is the actual chip to be positioned. The latter is only an image of this chip, such as is formed on a television monitor in response to observation of the actual chip by camera 30. Camera 30 being fixed in position, chip image 10 varies in shape and position in the same manner as chip 10a, itself. It should also be noted that, just like chip image 10, position markers 13 to 16 of FIGS. 1A and 1B and position markers 20 to 23 of FIGS. 2A and 2B, have no tangible existence, but are only monitor images of position marker signals which are electronically generated, as explained more fully hereinafter.

Returning to FIG. 3, mechanical positioning devices, such as motor-operated positioners 33 and 34, are placed along the edges of platform 11, so as to drive that platform selectively in the left, right, up and down directions, as indicated by appropriately labeled arrows in FIG. 3.

Camera 30 scans platform 31 in conventional manner, along vertically displaced, horizontal scanning lines. This scanning is controlled by sync generator 35, which supplies appropriate horizontal and vertical synchronizing signals to the camera.

The video signals produced by camera 30 are supplied, via a video trigger circuit 38 and a signal combining circuit 36, to a television monitor 37, where they produce the above-mentioned image 10 of chip 10a.

Video trigger circuit 38, in effect, sharpens and amplifies the video signals. It does this by responding only to camera signals above a predetermined threshold level, so as to trigger a substantially rectangular signal waveform of amplified magnitude which persists until the video signal again falls below the threshold. In this way, only comparatively strong video signals produce an output from trigger circuit 38, and this output is in the form of sharply defined rectangular waveforms, rather than gradual transitions.

The output signals from trigger circuit 38 are also supplied to one input of each of a plurality of "AND" gates 39a through 39d. The other input of each gate is supplied with a signal derived from a respective one of marker generators 40a through 40d.

These marker generators are, in turn, supplied with the horizontal and vertical sync signals from sync generator 35, and respond thereto to produce output signals representing the desired position markers 20 through 23. These position markers are also displayed on monitor 37, by application of the output signals from marker generator 40a through 40d to that monitor via combining circuit 36.

The signals from marker generators 40a through 40d are preferably supplied to monitor 37 with polarities opposite to that of the video signals from camera 30. As a result, markers 20 through 23 will have an appearance contrasting with that of chip image 10. For example, the markers may appear dark while the chip appears light. This enhances the visual contrast and makes use of the monitor easier.

The scale to which monitor 37 is shown in FIG. 3 is too small to permit meaningful illustration of the relationships between chip image 10 and markers 20 through 23, as displayed on the monitor. However, it will be recognized that these relationships are the same as between chip image 10 and markers 20 through 23 shown in FIGS. 2A and 2B, which can be regarded as being simply enlarged representations of the corresponding monitor displays.

Referring again to FIG. 3, each of "AND" gates 39a through 39d responds to the signals applied to its respective inputs to produce an output only when both input signals are present. Thus, gate 39a will produce an output signal only when a signal representing left marker 20 is present simultaneously with a video signal representing chip 10a. Gate 39b will produce an output signal when a signal representing right marker 21 is present simultaneously with a video signal representing chip 10a, and so forth.

Therefore, an output signal from any of gates 39a through 39d denotes the existence of overlap between the respective marker and chip image 10 displayed on video monitor 37.

The respective output signals from gates 39a through 39d are utilized to operate a further set of gate circuits 41a through 41d, whose other inputs are all supplied with the same signal from an oscillator 42.

Oscillator 42 operates independently, at a frequency such that several cycles occur within the time interval represented by the width of any marker. For example, if the width of the narrowest marker corresponds to a scanning time interval of 5 microseconds, then oscillator 41 may suitably operate at a frequency of 3 MHz.

The output signal from each AND gate 39a through 39d therefore controls the number of cycles of the output signal from oscillator 42 transmitted by the respective gate circuit 41a through 41d. The number of such transmitted oscillator signal cycles, in turn, indicates the amount of the aforementioned overlap between the respective markers and the chip image.

The cycles of oscillator signal so transmitted are applied to respective step charge circuits 43a through 43d, where each cycle contributes an increment of charge for storage in the respective circuit.

Periodically, preferably at the same rate at which the vertical synchronizing signals from generator 35 recur, all the step charge circuits 43a through 43d are discharged. To that end, vertical sync signals from generator 35 are applied to all these step charge circuits.

The amount of charge accumulated between successive discharges, in the respective step charge circuits 43a and 43b, is directly related to the amount of overlap between the left and right edges of chip image 10 and left and right position markers 20 and 21, respectively.

As previously explained, each marker extends over a plurality of scanning lines, and so does the chip image. Consequently, the above-mentioned amount of charge accumulated between successive discharges of the step charge circuits also represents the cumulative effect of overlap between marker and image over the plurality of scanning lines which they have in common. It can be shown that this is the equivalent of averaging the amount of overlap occurring over these same scanning lines.

Therefore the above-mentioned amount of charge accumulated in step charge circuits 43a and 43b represents the average amount of overlap between the left and right edges of chip image 10, and left and right position markers 20 and 21, respectively.

The difference between these accumulated charges (representing average overlaps) is determined by means of differential detector 44a, to which both step charge circuits 43a and 43b are connected. This difference then corresponds to the difference between the above-mentioned average of left and right overlap. The output signal of detector 44a, representing this difference, is utilized to energize positioning motor 33. If the output signal is of one polarity, it causes motor 33 to drive platform 31 in one direction, say to the right. If the output signal is of the opposite polarity, it causes the motor to drive the platform in the opposite direction, namely to the left.

Similarly, step charge circuits 43c and 43d, differential detector 44b and motor 34 cooperate to drive platform 31 so as to control the position of the top and bottom edges of chip image 10 in relation to top and bottom markers 22 and 23.

Together, motors 33 and 34 thus control the position of platform 31 so as to produce an equal amount of average overlap of each of the opposing edge markers. Because positioning relative to each marker is performed based on this average overlap between marker and chip image, the resultant chip centering action will be as shown in FIGS. 2A and 2B.

As previously noted, for chips with regular edges the prior art (FIG. 1A) is capable of providing positioning comparable to that of the present invention (FIG. 2A).

In contrast, for chips with irregular edges, the present invention (FIG. 2B) is capable of providing positioning with substantially greater precision than the prior art (FIG. 1B). This improvement is attributable to the fact that the present invention bases its position control on the average chip edge.

Clearly, the effect of local edge irregularities tends to be reduced by such averaging. Moreover, in practice the irregularities in semiconductor chip edges tend to be of random nature. Therefore, if one beam lead along a given chip edge happens to be unusually short, another may well be unusually long. Since the present invention relies on averaging the entire edge, such compensating irregularities further enhance the positioning accuracy.

The individual elements forming part of the overall arrangement shown in FIG. 3 can take any of the variety of conventional forms.

While not limited thereto, marker generator circuits 40a through 40d are preferably of the types which are disclosed for circuits performing marker generating functions in the above-mentioned copending application Ser. No. 147,051. By means of the adjustable controls provided in these circuits, they would be adjusted to provide markers of the configuration contemplated herein.

Various other elements of FIG. 3 may also take the form of their counterparts in said copending application.

Figure 4:
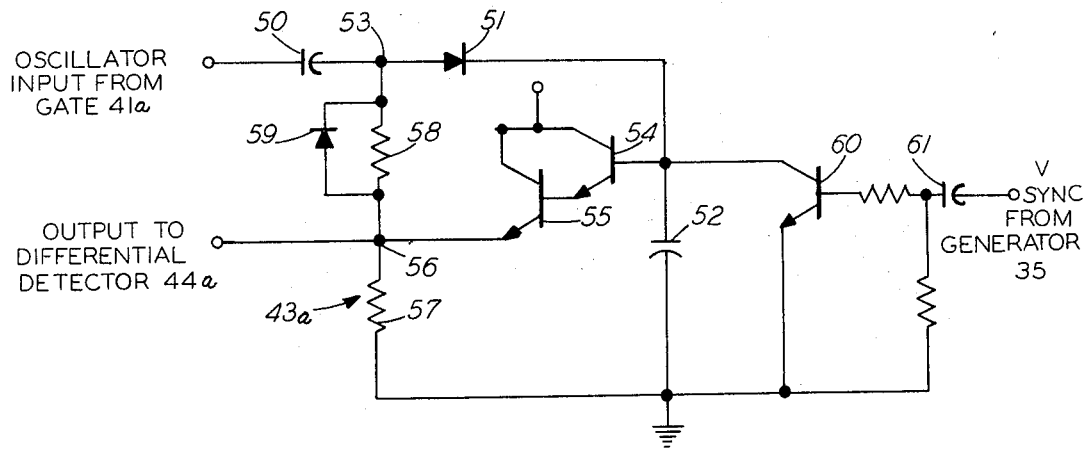
FIG. 4 is a schematic diagram of a preferred form of certain elements of FIG. 3.

While also not limited thereto, step charge circuits 43a through 43d are preferably of the form shown in detail in FIG. 4, to which reference may now be had.

FIG. 4 shows the schematic diagram of a typical one of these step charge circuits, namely circuit 43a of FIG. 3. One of the input signals to that circuit consists of the signal from oscillator 42, as passed by gate circuit 41a. This oscillator signal is applied, via series connected coupling capacitor 50 and diode 51, to one plate of a storage capacitor 52, whose opposite plate is grounded. The ungrounded plate of capacitor 52 is connected back to the junction 53 between capacitor 50 and diode 51. This is done by means of transistors 54, 55 connected in emitter-follower configuration and further connected to the junction 56 between resistors 57 and 58, which are in turn connected in series between ground and junction 53. A diode 59 parallels ungrounded resistor 58.

Also connected to the ungrounded plate of storage capacitor 52 is the collector output of a transistor 60, whose base is supplied via coupling capacitor 61 with pulses at the vertical synchronizing frequency derived from sync generator 35.

Storage capacitor 52 is so chosen in relation to the other time-constant determining parameters of FIG. 4 that its charging time constant is not appreciably longer, and preferably actually shorter than the period of the oscillator signal. Consequently, each cycle of the signal from oscillator 42 is capable of charging the capacitor substantially completely. The corresponding voltage developed at junction 56 constitutes the output signal of circuit 43a, which is then supplied to differential detector 44a. In addition, this voltage also appears at junction 53 where it is clamped by diode 59. Successive cycles of the signal from oscillator 42 are therefore superimposed upon this feed-back voltage, which represents the cumulative voltage-developing effect of prior oscillator signal cycles. The voltage developed across capacitor 52 will therefore increase substantially in proportion to the number of cycles of applied signal from oscillator 42, and so will the output signal from the step-charge circuit.

The signal from sync generator 35 which is applied to transistor 60 drives that transistor into conduction, discharging storage capacitor 52 and, in effect, resetting the step charge circuit for the next accumulation of output voltages, as determined by the number of cycles of oscillator signal supplied to the step charge circuit before its next discharge.

The other step charge circuits 43b through 43d, may be of the same construction as shown in FIG. 4, but provided with their respective input and output connections as shown in FIG. 3.

Various modifications of the specific embodiments disclosed herein will, of course, also occur to those skilled in the art without departing from the inventive concept.

What is claimed is:

1. In a method of positioning an object which involves scanning said object with a television camera along a multiplicity of lines, deriving video signals representing said line scannings of said object, and generating additional video signals which represent scannings along a multiplicity of lines of a positioning marker for said object, the improvement which comprises:
   detecting the amount of overlap between said object signals and said marker signals along any given scanning line;
   averaging said detected amounts of overlap over a plurality of said scanning lines; and
   utilizing said averaged amounts to control the position of the object.

2. In the method of claim 1, the further step of:
   displaying a plurality of the positioning markers and an image of said object on a television monitor; and
   adjusting said marker signals so that said displayed markers overlap respective edge portions of said object.

3. In the method of claim 1, the further step which comprises:
   controlling the generation of said additional video signals so that they represent scannings of markers overlapping opposite edges of said object.

4. The method steps of claim 3, wherein the positioning is controlled so as to substantially equalize said overlaps of opposite edges.

5. In the method of claim 1, the further step which comprises:
   controlling the generation of said additional signals so that they represent scannings of markers which overlap several spaced-apart edge portions of said object.

6. The method steps of claim 5, wherein said positioning is controlled so as to substantially equalize said overlaps of the respective edge portions.

7. The method steps of claim 5, further characterized in that said object has four generally rectangular edges, and said markers respectively overlap all four of said edges.

8. The method steps of claim 7, wherein said positioning is controlled to center said object between opposing pairs of markers.

9. A system for controlling the position of an object comprising:
   means for producing video signals representing the scanning of said object along a multiplicity of scanning lines;
   means for generating additional signals representing the scanning of a position marker extending over segments of a plurality of adjacent ones of said scanning lines;
   means for detecting the amount of overlap between said video signals and said additional signals along any given scanning line;
   means for averaging said detected amounts over a plurality of said scanning lines; and
   means for utilizing said detected average to control the position of said object.

10. The system of claim 9 further comprising:
    a television monitor;
    means for supplying said video signals and said additional signals to said monitor so as to display thereon images of said object and of said markers; and
    means for positioning said displayed markers so as to overlap respectively the desired positions of the different edges of said object image.

11. The system of claim 10, wherein said object is a beam-leaded semiconductor chip and said edges are the tips of the beam leads which form part of said chip.

12. The system of claim 9, wherein said averaging means comprises a step charge circuit, means for charging said circuit in a plurality of steps respectively representative of said detected amount of overlap along different ones of said plurality of lines, and means for discharging said circuit between recurrent scannings of said plurality of lines.

13. The system of claim 12, wherein said detecting means comprises a gate circuit responsive to overlap between said video signals and said additional signals to produce an output signal proportional to said overlap, and means for supplying said output signal to said step charge circuit.

14. The system of claim 13, further comprising an oscillator producing a signal of such frequency that a plurality of cycles occur during each said overlap, and means for supplying to said step charge circuit a number of said cycles determined by said gate circuit output signal.

15. The system of claim 14, wherein said gate circuit comprises capacitor storage means, an input circuit for charging said storage means with said supplied oscillator signal cycles, means for feeding back to said input circuit a voltage proportional to the charge on said storage means, and means for deriving an output signal proportional to said feed-back voltage.

16. The system of claim 14, wherein said means for discharging said step charge circuit comprises means for discharging said capacitor storage means.

* * * * *